Jan. 27, 1970   A. C. VALIANT, JR   3,491,463
SCORING METHOD

Filed Sept. 6, 1966   2 Sheets-Sheet 1

INVENTOR.
ARTHUR C. VALIANT, JR.
BY
Attorney

Jan. 27, 1970     A. C. VALIANT, JR     3,491,463
SCORING METHOD

Filed Sept. 6, 1966     2 Sheets-Sheet 2

FIG. 3

INVENTOR.
ARTHUR C. VALIANT, JR
BY
*Warren D. Hochbert*
Attorney

United States Patent Office 3,491,463
Patented Jan. 27, 1970

3,491,463
SCORING METHOD
Arthur C. Valiant, Jr., 831 E. Chandler Ave.,
Evansville, Ind. 47713
Filed Sept. 6, 1966, Ser. No. 577,396
Int. Cl. G09b 19/00; B41l 27/26
U.S. Cl. 35—48                                    1 Claim

ABSTRACT OF THE DISCLOSURE

A method of scoring student answer cards which consists of the steps of registering a printing stamp in alignment over a marked answer card, blocking out portions of the printing stamp with a stencil block-out sheet from which portions have been cut out representing either correct or incorrect answers, imprinting the marked answer card with the stencil-blocked printing stamp, and determining any departure from the correct or incorrect answer impressions transferred onto the answer card and the student answer markings on the answer card.

---

The present invention relates to a scoring device and method, and more particularly to a new and novel structure and approach for the important application of grading examinations or the like.

As is known, it has been a tedious and time-consuming job for the teacher to grade and compile the results of a large number of test or examination papers. Heretofore, the preceding has usually been accomplished by the individual scrutiny of each paper. Any mechanical approaches have been expensive, and rather sophisticated, considering usual classroom size, demanding, more or less, large scale operation.

By virtue of the instant invention, the applicant herein has provided a new and novel scoring device and method having great adaptability for reducing the time, and, as well, promoting accuracy, in the grading of examination papers and tabulating the final results. The invention basically comprises a student's answer sheet, a teacher's answer sheet, and structure including a resiliently mounted pre-inked stamp or die for achieving the desired end results.

In this latter connection, and briefly, the student marks the student answer card in response to the various examination questions, where the teacher's answer card is punched, where appropriate, to indicate the position of the various correct answers. Thereafter, the teacher's answer card is removably positioned on the scoring structure so that portions of the pre-inked stamp or die are exposed through the aforesaid punched openings to indicate the over-all correct answer pattern.

The stamp is then brought into contact with the student answer card, and it is a simple matter for the teacher to compare the student's check marks or symbols with the inked proper answer markings which have been made on the student's answer card by the stamp. In other words, and by way of example, if any of the student's answers are out of register with the inked markings, the student is incorrect and it is an easy matter of counting the number of miss-registers to totalize the student's score in the examination.

The instant invention is represented by simplicity in structure, being readily assembled and effective in end use. Additionally, the student answer card, in various forms, is relatively insignificant in cost, as is the teacher's answer card. The applicant's instant scoring procedure provides a simplicity not available heretofore, and one which gives positive and accurate end results.

Accordingly, the principal object of the present invention is to provide a new and novel scoring device and method.

Another object of the present invention is to provide a new and novel scoring arrangement having particular adaptability in the grading of examination papers or the like.

A further and more general object of the present invention is to provide a new and novel scoring device and method which is simple in form; which is readily used; which is positive in end results; which is inexpensive; and, which provides a time savings and expediency of operation not at all available heretofore.

Other objects and a better understanding of the present invention will become more apparent from the following description, taken in conjunction with the accompanying drawings, wherein.

Figure 2:
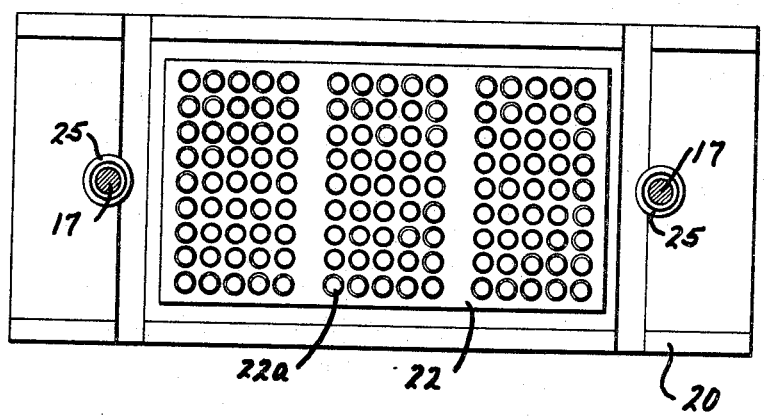
FIG. 2 is a view in horizontal section, taken at line 2—2 of FIG. 1 and looking in the direction of the arrows, showing further details of the invention at hand; and, FIG. 3 is a plan view of one possible form of student answer card for use herein.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
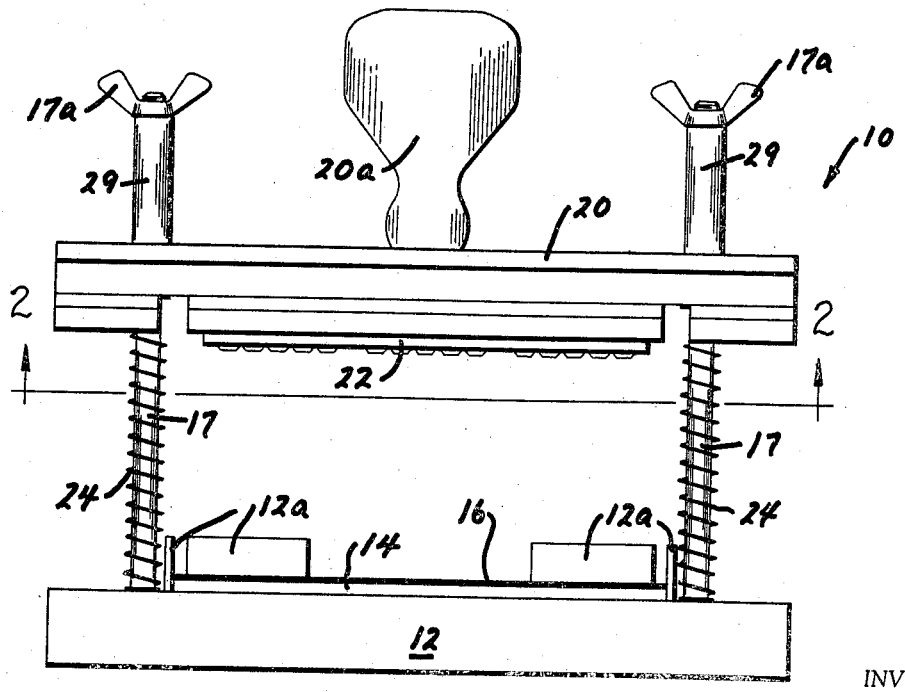
FIG. 1 is a view in front elevation showing the applicant's new and novel scoring device.

Referring now to FIGS. 1 and 2, the applicant's new and novel scoring device 10 typically comprises a base member 12 having upstanding portions 12a arranged so as to receive a resilient or sponge pad 14 within the confines of the space defined thereby. Actually, the arrangement of the upstanding portions 12a may depend upon the size including the stacking height, of student answer cards 16, to be described herebelow, received on the resilient pad 14. In other words, and as should become apparent, the aforesaid upstanding portions 12a serve to permit ready and uniform positioning of student answer cards 16 on the resilient pad 14 disposed on base member 12. Shafts 17 extend upwardly from the base member 12, and through openings in a movable member 20 on which, typically, a pre-linked stamp or die 22 is disposed on the surface thereof adjacent the base member 12. The movable member 20 is retained in a normally spaced-apart relationship with respect to the base member 12 through resilient members 24, such as coiled springs, for example, where such assembly is completed through the use of washers 25.

In a preferred embodiment of the invention, collars 29 may be employed about the portions of the shafts 17 extending above the movable member 20, where wing nuts 17a serve to retain the components in assembled relationship. A handle 20a secured to the member 20 permits ease in movement of member 20 and, hence, the stamp 22 towards the base member 12, when in use.

FIG. 3 shows one form of student answer card 16, where, for example, the examination questions may be answered by the students by placing an X or like symbol in any of the box areas 16a provided adjacent to the number of each question. Obviously, the student answer card 16 may assume various patterns, depending upon the particular examination involved. In any event, the stamp 22 also has the same pattern as the student answer card 16, i.e., and as should be apparent from FIG. 2, raised portions 22a on the stamp 22 are disposed in register with the aforesaid box areas 16a.

In use, and in addition to the structure set out hereabove, a teacher answer card is provided, the latter not being shown. In this connection, the teacher answer card is similar in layout or pattern to the student answer card 16, i.e., by way of illustration, has corresponding rows of numbered questions and box areas for the respective answers. Actually, however, the teacher answer card may be made from thinner paper stock than the student answer card 16.

In any event, the teacher takes the teacher answer card and with a conventional paper punch, punches out the appropriate correct answer box area for each of the examination questions. Thereafter, the teacher answer card is secured in position on and over the prelinked stamp 22. In this connection, the teacher answer card may be temporarily secured in the desired position through adhesive means, such as tape, for example (also not shown).

In that the teacher has punched out spaces on the teacher answer card corresponding to the correct answers, part of the stamp 22 is revealed, i.e. the raised portions 22a. In other words, when the movable member 20 is viewed in the position of FIG. 2, and when the teacher answer card is in position, only raised portions 22a corresponding to the correct answer positions are observed.

Thereafter, and through use of the handle 20a, the member 20 carrying the teacher answer card is moved into contact with a student answer card 16 (or a stack of student answer cards 16) which has been placed in position surrounded by the upstanding portions 12a of the base member 12 and on the resilient or sponge pad 14. With the contacting of the uncovered portions of the stamp 22 and the student answer card 16, inked markings are transferred or applied thereto, and after processing each of the student answer cards 16 in the manner described above, the teacher can readily determine the answers missed by the students. In other words, since the inked markings show the correct answers, any X's or symbols outside of the inked markings on the student answer card 16 represent an erroneous answer by the student, and it is then only a simple matter for the teacher to tabulate the correct student grade.

From the preceding, it should be apparent that the applicant herein has provided a new and novel arrangement for grading examination or like test papers. The device is simple to operate, and represents a considerable savings in time over procedures in use heretofore. Moreover, the device is uncomplicated, representing a minimum of cost to the user. Additionally, the procedure presents no difficulty to the student, in that the student simply indicates an answer to each of the examination questions on the student answer card.

The scoring device and method described hereabove is, of course, susceptible to various changes within the spirit of the invention. For example, the base member may be altered so that the student answer cards are retained thereon through different structural arrangements. Moreover, and as stated, the pattern or answer configuration on the student answer card can be changed considerably, and in some instances, it might be desirable to have the impressed or transferred markings show the incorrect answer instead of the correct answer. Additionally, other arrangements may be provided in mounting the members 12 and 20 to register with each other. Thus, the above description should be considered illustrative and not as limiting the scope of the following claims.

I claim:
1. The method of scoring a marked student answer card containing a number of discrete answer areas for each of a plurality of problems presented to a student, there being at least one correct answer for each problem, which method comprises the steps of concealing certain portions of a printing stamp with a stencil block-out means, the remaining revealed portions of said printing stamp corresponding to the correct or incorrect answers to said problems, disposing said printing stamp in register and marking relationship with said marked student answer card, and determining any departure from the correct or incorrect answer impressions transferred onto said student answer card and said markings on said student answer card.

References Cited

UNITED STATES PATENTS

| | | | |
|---|---|---|---|
| 257,423 | 5/1882 | Williamson | 101—112 X |
| 1,252,199 | 1/1918 | Thompson | 35—48.1 |
| 1,550,893 | 8/1925 | Elliott | 101—48 |
| 2,142,419 | 1/1939 | Strongman | 35—48 |
| 2,819,668 | 1/1958 | McAneny | 101—125 |
| 3,128,564 | 4/1964 | Atherton | 35—48.1 |
| 3,359,656 | 12/1967 | Seekins | 35—48.1 |

EUGENE R. CAPOZIO, Primary Examiner

WALTER W. NIELSEN, Assistant Examiner

U.S. Cl. X.R.

101—125